United States Patent [19]

Bierhoff et al.

[11] Patent Number: 4,740,938

[45] Date of Patent: Apr. 26, 1988

[54] APPARATUS FOR RAPID REPRODUCTION OF INFORMATION FROM A RECORD CARRIER

[75] Inventors: Martinus P. M. Bierhoff; Karel M. L. De Decker, both of Eindhoven, Netherlands

[73] Assignee: U.S. Philips Corporation, New York, N.Y.

[21] Appl. No.: 719,609

[22] Filed: Apr. 3, 1985

[30] Foreign Application Priority Data

Oct. 22, 1984 [NL] Netherlands .......................... 8403199

[51] Int. Cl.⁴ ........................ G11B 27/10; G11B 21/10
[52] U.S. Cl. ........................................ 364/32; 369/41; 369/30; 360/78
[58] Field of Search ..................... 360/69, 72.1, 72.2, 360/78; 369/30, 32–34, 41–48, 59, 25, 28; 358/342, 907

[56] References Cited

U.S. PATENT DOCUMENTS 4,321,635 3/1982 Tsuyuguchi ........................... 369/25
4,509,154 4/1985 Kimoto ................................. 369/33

FOREIGN PATENT DOCUMENTS 0089020 9/1983 European Pat. Off. ............. 369/32
59-175082 10/1984 Japan .................................... 369/32
60-32181 2/1985 Japan .................................... 369/32
2101356 1/1983 United Kingdom ................. 369/43

Primary Examiner—Raymond F. Cardillo
Assistant Examiner—Steven R. Garland
Attorney, Agent, or Firm—Thomas A. Briody; Jack Oisher; William J. Streeter

[57] ABSTRACT

An apparatus for reproducing information in the form of one or more information blocks in the track of a record carrier, for example a compact-disc digital audio player, is equipped with a memory having n storage locations for storing in each of these storage locations one sequence number corresponding to an information block (if present) whose beginning is situated in a portion of the record carrier corresponding to each storage location, where $n < 99$, and first means for the storage of or containing data relating to the size and the location of the portions on the record carrier, or for the storage of or containing data from which the size and the location of the portions on the record carrier can be derived. Suitably, n is not greater than 10. By means of such an apparatus searching for a following track number that has been selected can be effected more rapidly.

9 Claims, 3 Drawing Sheets

APPARATUS FOR RAPID REPRODUCTION OF INFORMATION FROM A RECORD CARRIER

FIELD OF THE INVENTION

The invention relates to an apparatus for reproducing information stored in the form of one or more information blocks in a track of a record carrier. It comprises first read means for reading said record carrier and control means for controlling the read means in such a way that a selected information block can be reproduced.

The invention also relates to a record carrier for use in an apparatus in accordance with the invention.

BACKGROUND OF THE INVENTION

The apparatus of the type specified in the opening paragraphs is, for example, a compact-disc digital audio player which is used with a record carrier in the form of an optically readable disc carrying digitally encoded audio information. An example of such a compact-disc digital audio player is a player which is commercially available from N. V. Philips' Gloeilampenfabrieken under the type designation CD303 at the date of filing of the present application. Before a disc is played on this player it is possible to key in a selection to be reproduced. For this purpose use is made of a subcode which is interleaved with the digital audio information and which inter alia contains a running indication for the track number being reproduced, an index (part of a "track"), and relative and absolute time. In the various known players the parameters which can be programmed are track number, index, and/or time. The keyed-in selection may be stored in a memory as long as playing proceeds.

It is the object of the invention to improve the ease of operation of the known apparatus by speeding up the process of searching for the next track of the selection thus made.

SUMMARY OF THE PRESENT INVENTION

To this end the apparatus is characterized in that it comprises:

a memory having a number of n storage locations for storing in each of said storage locations a sequence number corresponding to an information block (if present) whose beginning is situated in a portion of the record carrier allocated in each storage location, where $n > 99$, and first means for the storage of or containing data relating to the size and location of the portions on the record carrier, or for the storage of or containing data from which the size and the location of the portions on the record carrier can be derived. In this respect it is to be noted that the size and the location of the portions of or on the record carrier may be expressed in and therefore characterized by both units of "time" and units of "length".

In the current "compact-disc" player an information block to be reproduced next (hereinafter referred to as "track") is searched as follows.

Assume that at a specific instant track i is being reproduced and via the keys it is requested to reproduce track j, j being for example greater than i. Since the numbers of the tracks on the record carrier increase from the center towards the periphery, not necessarily starting with 1, the control means know that the track number j must be situated further towards the periphery of the record carrier. In order to speed up the search process the control means then control the read means so as to make radial jumps of 256 tracks. Each jump is made towards the periphery of the record carrier; and after every jump, tracking is restored and the location of the read means relative to the track is derived from the subcode. If track number j is not yet reached, a new jump over 256 tracks towards the periphery of the record carrier is made. This continues until after such a jump the track j is reached, for example in that after this jump the read means are already situated at track j. Subsequently, a backward jump over 128 tracks is made and again the number of the track at which the read means are now located is derived from the subcode. If the read means are now located at track number $j-1$ a forward jump over 64 tracks is made. In this way the beginning of track j is reached by forward or backward jumps which each time become factor of 2 smaller. Such a search procedure is also referred to as the "binary search" code procedure. This "binary search" procedure may take much time, in particular if the tracks j and i are situated far from one another.

In the foregoing reference has been made to "jumps over a number of tracks". It is to be noted that record carriers such as compact discs comprise only one track which extends along the spiral path from the center towards the periphery of the record carrier. Therefore, the statement "jumps over a number of tracks" is to be understood to mean in fact jumps which equal the size of a number of times the track pitch, which is the radial displacement of the read means in one revolution of the record carrier.

Further, it is to be noted that the choice of the jumps over 256 tracks is dictated by the fact that the lead-out track which is situated after the end of the last track number on the record carrier should have a width of at least 300 tracks. Using jumps over 256 tracks ensures that the lead-out track is always reached in the case of an outward search movement over the record carrier.

It is possible to store the data contained in the lead-in track of the record carrier and relating to the number of tracks and the starting times of each track number in an associated memory in the apparatus. If, moreover, a conversion table in which the times on the record carrier are plotted versus the radial positions on the record carrier (for example in numbers of "tracks", i.e. the number of track pitches from the lead-in track) is stored in the apparatus, the search process can be carried out much faster.

After the instruction to reproduce track j the apparatus determines the radial positions corresponding to the starting times of the tracks i and j. Subtracting the two positions yields the number of tracks over which the control means should cause the read means to jump in a radial direction to reach at least the vicinity of track j. Subsequently, the beginning of the track j is located by means of the "binary search" procedure. The relevant track number j or the number $j+1$ or $j-1$ is now already reached by making only one large jump over a number of tracks which is (substantially) larger than 256, in particular if the tracks are situated far from each other, so that the searching time can be reduced significantly.

It is to be noted that it is known per se to read data relating to the location of tracks on a record carrier from the track at the beginning of the record carrier and to store this data in a memory of an apparatus for reproducing information. Refer to, for example, European Patent Specification No. 29.946. This Specification relates to an apparatus for reading information from a magnetic record carrier.

Since the lead-in track of the record carrier can store 99 track numbers and their starting times, the above proposal would mean that the reproducing apparatus should have a memory which in the extreme case can store the data relating to these 99 track numbers. This requires a comparatively large memory, which may be very unfavorable in view of the architecture and the capacity of the microcomputer system to be used in the apparatus. In other words, the use of a smaller memory is to be preferred. Moreover, in view of the accuracy of the search procedure, which accuracy depends on the inaccuracy in the track pitch and the tangential speed and which is of the order of magnitude of 10% of the jump size, it is neither necessary nor useful to store all track data in the apparatus.

In accordance with the invention the record carrier is divided into a number of n (smaller than 99), preferably not more than 10, ficticious fixed portions. The fixed portions are bounded by their inner and outer diameters. In other words, each portion corresponds to a parameter which indicates the number of tracks by which the beginning is spaced from the lead-in track. A number of ten portions has been selected because the record carrier is approximately 20,000 tracks (i.e. 20,000 times the track pitch) wide, so that portions having a width of 2048 tracks each are defined. This number is favorable because 2048 is a power of 2.

In the present example this yields for example the numbers 0, 2048, 4096, 6144 etc. These numbers correspond to times in conformity with the aforementioned conversion table. Now the associated memory in the apparatus should have only the aforementioned n storage locations and can therefore be substantially smaller than the previously mentioned memory. The number of a track in the relevant portion, for example the first or the last track in this portion (i.e. that track whose beginning is situated nearest the beginning or the end of the relevant portion of the record carrier) but preferably the first track number, may now be stored in a storage location of the memory which corresponds to a specific portion of the record carrier.

If the first track numbers of a portion are stored in the corresponding storage locations, the contents of the memory may be for example as follows: 1, 3, 4, 7, 9. The first portion of the record carrier contains track number 1 and (the beginning of) track number 2. The second portion of the record carrier contains the (beginning of) track number 3.

The third portion of the record carrier contains the track numbers 4 and 5 and (the beginning of) track number 6. The fourth portion contains track number 7 and (the beginning of) track number 8. The fifth portion contains (the beginning of) track number 9. Suitably, the memory also contains a number which indicates the total number of tracks on the record carrier. In that case the memory has one storage location more than the number of portions into which the record carrier has been divided.

If the total number of tracks in the preceding example is ten, the fifth portion will therefore contain the entire track number 9 and (the beginning of) track number 10.

In the storage location corresponding to a portion of the record carrier which does not contain the beginning of a track it is possible to store an associated indication, for example the number "zero".

The apparatus may be characterized further in that the memory comprises an additional storage location for the storage of a number representing the number of information blocks on the record carrier.

The memory with n storage locations may be filled in various manners.

In a first embodiment the apparatus may be characterized in that it further comprises
second read means for, prior to the reproduction of the information, reading from the record carrier the sequence numbers to be stored in the memory.

This is possible only if the relevant sequence numbers are contained in the lead-in track of the record carrier, which is not yet the case.

A second embodiment may be characterized in that it further comprises
second read means for reading data relating to the location of the beginning of the one or more information blocks on the record carrier from the record carrier prior to the reproduction of the information, and
second means for comparing the data relating to the location of the beginnings of the information blocks on the record carrier with the data relating to the location of the portions on the record carrier and for generating not more than once for a portion of the record carrier a control signal for storing the sequence number of the information block (if present) whose beginning is situated in said portion of the record carrier in the storage location corresponding to the said portion.

This enables the currently available record carriers to be used and the sequence numbers corresponding to the portions of the record carrier to be determined in the apparatus itself and to be stored in the memory.

The apparatus may be characterized further in that it further comprises:
third means for comparing the sequence number of a selected information block with the sequence members stored in the memory and for generating a control signal to be applied to the control means, in such a way that the first read means are positioned at the beginning of the selected information block and subsequently said inforinformation block can be reproduced.

Thus, as stated previously, the first read means can be positioned in two steps. Firstly, a coarse step, in which a large jump corresponding to the width of one or more adjoining portions of the record carrier is made, and, subsequently, a fine-search step, in which the beginning of the track is located by means of the "binary search" procedure. Determining the size of the coarse step, i.e. determining when the first read means have carried out the jump corresponding to the width of one or more portions of the record carrier, may be effected by, for example, counting the number of track transitions detected during the radial movement of the first read means over the record carrier. Another possibility is to determine the displacement of a cursor on the actuator which forms part of the third means and which drives the first read means, which cursor indicates the position of the actuator and hence of the first read means.

Embodiments of the invention will now be described in more detail, by way of example, with reference to the accompanying drawings. In the drawings

DETAILED DESCRIPTION OF THE INVENTION

Figure 1:
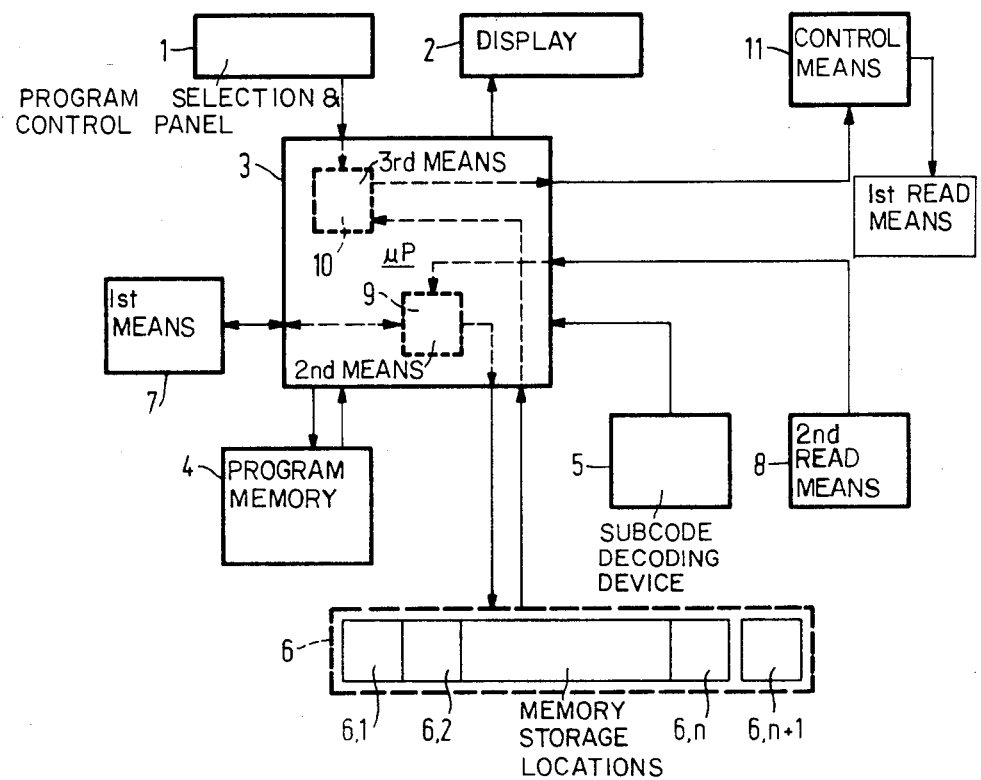
FIG. 1 shows an apparatus in accordance with the invention.

FIG. 1 is a diagram representing the principle of a "compact disc" player insofar as it is relevant to the present invention. The diagram is based on commercially available "compact disc" players, such as for example the player which is available from N. V. Philips' Gloeilampenfabrieken under the type number 303. These known players comprise a program-selection and control panel 1, for example, a row of keys each corresponding to a specific track number and a display 2 on which the selected number is displayed, for example a row of lamps each of which corresponds to a specific track number. In addition to program selection by the track number it may be possible to select by index (parts of tracks), time within a track, or absolute time. A microcomputer 3 scans the control panel 1 and drives the display 2. Further, the microcomputer 3 can read the selected program into and out of a program memory 4 in order to control the player in such a way during playing of the disc that the selected program is reproduced. For this purpose, the microcomputer 3 receives from a subcode decoding device 5 the subcode which is interleaved between the music data on the disc and in which inter alia the track numbers, index and time have been encoded in running form, so that the microcomputer receives information about the location on the disc where reproduction is effected.

In accordance with the invention, the apparatus further comprises a memory 6 having n storage locations 6.1, 6.2 ... 6.n, where $n < 99$ and preferably not more than 10, and an additional storage location 6.n+1. Further, the apparatus comprises first means 7 for the storage of or containing data relating to the respective sizes and the locations of n portions on the record carrier or for the storage of or containing data from which the size and the location of n portions on the record carrier can be derived.

Figure 2:
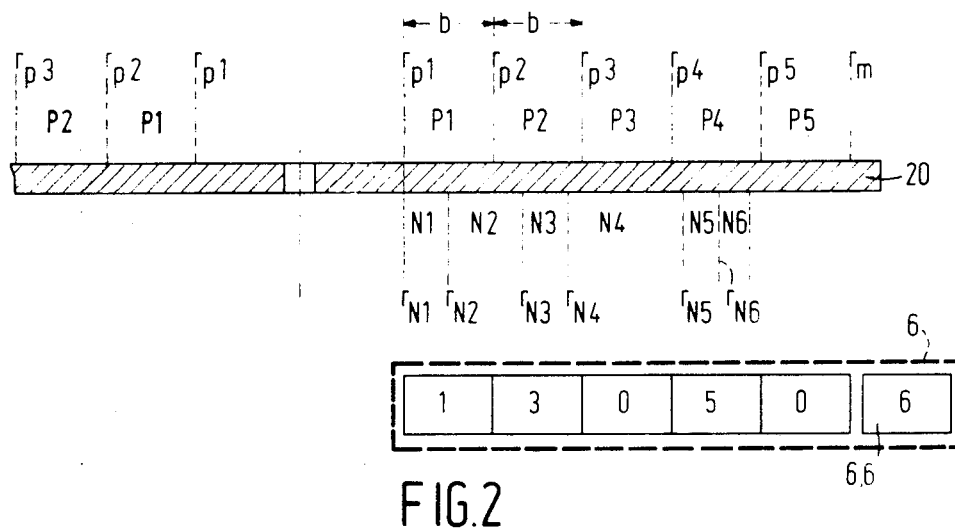
FIG. 2 shows a part of a record carrier in cross-sectional view and the memory used in the apparatus of FIG. 1.

FIG. 2 shows a part of the record carrier 20 in cross-sectional view. The record carrier has been divided into five portions P1 to P5. The portions are characterized by their boundaries $r_{p1}$ to $r_{p5}$ and $r_m$. If the beginning of the record carrier is taken as a reference, which means that $r_{p1}=0$, then $r_{p2}$ to $r_{p5}$ represent the distance of the beginning of a portion from the beginning of the record carrier. The distances $r_{p1}$ to $r_{p5}$ may be expressed in units of "time" or in units of "length" (denoting the time or the number of revolutions required for the read means to proceed from, for example, $r_{p1}$ to $r_{p2}$).

FIG. 2 shows that the portions P1 to P5 all have the same width b (which, in general, is not strictly necessary!). If $r_{p1}$ to $r_{p5}$ are expressed in units of "length" and if $r_{p1}=0$, then $r_{pi}=(i-1)r_{p2}$, where $i \geq 3$. This means that $r_{p3}$ to $r_{p5}$ are multiples of $r_{p2}$. In the previously mentioned example this means that $r_{p1}=0$, $r_{p2}=2,048$, $r_{p3}=4,096$, ... etc. If $r_{p1}$ to $r_{p5}$ are expressed in units of "time", then $r_{p1}$ may be 0, $r_{p3}-r_{p2}$ will be larger than $r_{p2}$, $r_{p4}-r_{p3}$ will be larger than $r_{p3}-r_{p2}$ etc., because the speed of revolution of the record carrier decreases as a track which is situated nearer the periphery of the record carrier 20 is reproduced. It will be evident that there is a (known) relation between $r_{pi}$ expressed in units of "length" and $r_{pi}$ expressed in units of "time". This relation is defined by a mathematical formula, previously referred to as the conversion table.

The parameters $r_{p1}$ to $r_{p5}$ may now be stored in the first means 7 expressed in units of "time" or units of "length". If the portions P1 to P5 have the same width b, it may even be adequate to store only the value of $r_{p2}$ expressed in units of "length".

Moreover, if the number of portions (namely 5) is known, while $r_m$ is also known for record carriers of the "compact-disc" type, the other values $r_{p3}$ to $r_{p5}$ can be derived (in the microcomputer 3). If the aforementioned formula or conversion table is also stored in the microcomputer 3 or in the first means 7, all the information as regards the location and size of the portions P1 to Pn (n being 5 in FIG. 2) on the record carrier is known or can be derived.

In the memory 6 in FIG. 1 the sequence number of an information block (if present) whose beginning is situated in a portion Pi of the record carrier 20 corresponding to a storage location is stored in the various storage locations 6.1 to 6.n. The storage location 6.n+1 contains the number m which represents the number of tracks on the record carrier.

FIG. 2 shows that the record carrier 20 contains (m=) six tracks N1 to N6. FIG. 2 also shows the corresponding contents of the memory 6. The various storage locations of the memory contain the sequence number of that track whose beginning (i.e. the left-hand boundaries of the tracks of Ni) is situated nearest the beginning (i.e. the left-hand boundaries of the portions Pj) of an associated portion Pj. FIG. 2 clearly shows that the portions P3 and P5 do not contain a beginning of a track. The portion P5 even contains no information at all. In such a case for example a 0 may be stored in the corresponding storage locations. The storage location 6.6 contains the number 6.

The memory 6 may be filled in various ways.

For a first possibility it is assumed that the relevant sequence numbers (i.e. the contents of the memory) have been recorded in the lead-in track of the record carrier. The apparatus in FIG. 1 comprises second read means 8 for, prior to the reproduction of the information, reading from the record carrier the sequence numbers to be stored in the memory. For this purpose the second read means are coupled to the microcomputer 3, which transfers the relevant data from the second read means 8 to the memory 6. Thus, in the example of FIG. 2 the second read means will read the numbers 1-3-0-5-0 from the record carrier 20. Moreover, the number (m=) 6 is read from the lead-in track and is stored in the storage location 6.6.

In accordance with a second possibility, which will be described in more detail with reference to the flow chart of FIG. 3, the second read means 8 read the data relating to the location of the beginning of one or more information blocks on the record carrier from the lead-in track before reproduction from the record carrier 20. For this purpose the apparatus also comprises second means 9 having a first input coupled to the read means 8 and a second input coupled to the first means 7, and an output coupled to the memory 6, for comparing the data relating to the location of the beginning of the information blocks on the record carrier 20 with the data relating to the location of the portions on the record carrier and for generating not more than once for one portion of the record carrier a control signal for the storage of the sequence number of that information block whose beginning is situated in the relevant portion of the record carrier in the storage location corresponding to this portion.

This method operates as follows. See FIG. 3. The program is started in block 30. In block 32 the memory 6 is completely filled with "zeros". This means that a zero is stored in all the storage locations 6.1 to 6.n+1 inclusive. Subsequently, in block 34 the number m indicating the number of tracks on the record carrier and the sequence number $i_o$ of the first track are read from the lead-in track of the record carrier via the second read means. In block 35 a running variable i, representing the sequence number of the track, is set to the value $i_o$ and a running variable j, representing the number of the portion of the record carrier, is set to the value 2. In block 36 the value i ($=i_o$) is stored in the first storage location 6.1 and the value m is stored in the storage location 6.n+1. Subsequently, in block 38 the variable i is incremented by one. Now, the second read means read the starting time of the next track from the lead-in track and in block 42 the starting time is converted into a starting position $r_{Ni}$ by means of the aforementioned conversion formula or table. After this it is ascertained in a program step 44 whether i is equal to $m+i_o+1$. If i is not equal to the value $m+i_o+1$ the program proceeds from 44 to block 46, in which it is ascertained whether $r_{Ni}$ is smaller than $r_{pj}$. If this is the case (which means that the beginning of track i is still situated in the preceding portion $P_j$), the program returns to block 38 via the branch 48. For track number 2 in the example of FIG. 2 the program actually proceeds via this branch 48. If it is found in block 46 that $r_{Ni}$ is greater than or equal to $r_{pj}$ the program proceeds via block 50, in which the variable j is incremented by one, to block 52, in which $r_{Ni}$ is again compared with the beginning $r_{pj}$ of the next portion on the record carrier. If $r_{Ni} < r_{pj}$ the beginning of the track $N_i$ is situated in the portion P with the number j−1 and the number i is stored in storage location j−1 of the memory 6 in block 56. If in block 52 $r_{Ni}$ is still greater than or equal to $r_{pj}$ the program proceeds to block 50 via branch 54. This happens if a portion P does not contain a beginning of a track, such as portion P3 in FIG. 2. From block 56 the program proceeds to block 58, in which it is ascertained whether j is equal to n+1. If this is not the case, the program proceeds to block 38 via branch 60 for eventually storing a following track number in a following storage location. If it is found in block 44 and block 58 that i and j are equal to $m+i_o+1$ and n+1, respectively the program proceeds to block 66 via branches 62 and 64, respectively, in which block the program is terminated. From block 58 it appears that the variable j can assume a value equal to n plus one. For $r_{P.n+1}$ the value $r_m$, see FIG. 2, should be taken, which value is also available in the apparatus.

Figure 4:
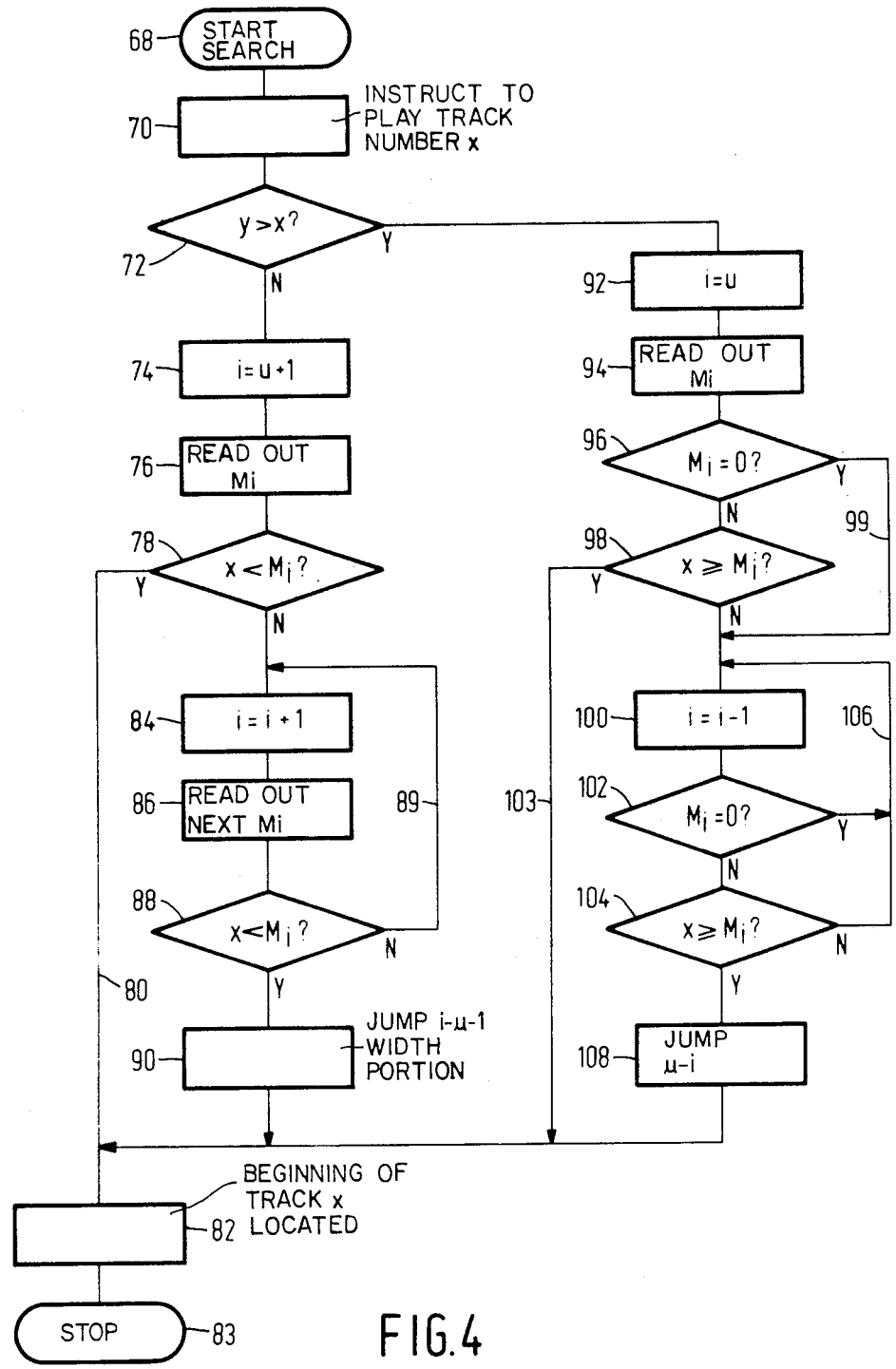
FIG. 4 is a flow chart which represents how a selected track is searched.

FIG. 4 illustrates a possible method of searching for a selected track. For this purpose the apparatus also comprises third means 10 having a first input coupled to the control panel 1, a second input coupled to the memory 6, and an output coupled to the control means 11. The control means are adapted to control the first read means in such a way that a selected information block can be reproduced. The third means 10 are adapted to compare the sequence number of a selected information block with the sequence numbers stored in the memory and to supply a control signal for the control means 11, in such a way that the read means are positioned at the beginning of a selected information block (track) and subsequently the information block can be reproduced.

Searching may be effected as follows. In FIG. 4 the search process starts in block 68, after which in block 70 the instruction is given to play track number x. The apparatus has the information that it has reached track number y, which is situated in portion u (i.e. Pu) of the record carrier. In block 72 it is checked whether $y > x$. If this is not the case, i.e. if number x is situated further than number y, a running variable i is made equal to u+1 in block 74, and the number $M_i$, stored in the $i^{th}$ storage location of the memory 6, is read out in block 76. Subsequently, in block 78 it is ascertained whether $x < M_i$. If x is actually smaller than $M_i$, this means that number x and number y are apparently situated in the same portion Pu of the record carrier. The program then also proceeds to block 82 via the branch 80, in which block the beginning of track x is located by means of the fine-search or binary-search process, and the search program is terminated in block 83.

If in program step 78 it is found that $x \geq M_i$, the program proceeds to block 84, in which the running variable is incremented by one, and the number $M_i$ stored in the next storage location of the memory 6 is read out in block 86. Subsequently, in block 88 it is again checked whether $x < M_i$. If this is the case, the beginning of track x is apparently situated in the next portion P.u+1 or, in general, in portion P.i−1. In block 90 a jump equal to the width of i−u−1 portions P is made to the portion in which the beginning of track x is situated and, subsequently, in block 82 the beginning of the track x is located by means of the fine-search process. If in block 88 it appears that $x \geq M_i$ the program returns to block 84 via the program branch 89 and, subsequently, in blocks 86 and 88 it is checked whether (the beginning of) track x is situated in an adjoining portion P of the record carrier.

If it is found that $y > x$ in program step 72, the program proceeds to block 92 in which a running variable i is made equal to u. In block 94 $M_i$ is read out of the $i^{th}$ storage location of the memory 6. Subsequently, in step 96 it is ascertained whether $M_i$ is zero. If it is, the beginning of the track is situated in portion u and the program proceeds to block 100 via branch 99. If in 96 it is found that $M_i$ is not zero, the program proceeds to 98 where it is checked whether $x \geq M_i$. If this is the case, the beginning of track x is situated in portion u. The program then proceeds to block 82 via branch 103, after which by means of the fine-search process the beginning of track x is located. If it is found in 98 that $x < M_i$, the program also proceeds to block 100 in which the running variable i is decremented by one. Again it is checked in 102 whether the contents of $M_i$ is zero. If it is (information block i does not contain the beginning of a track), the program proceeds to 100 via branch 106. If $M_i$ is not zero, the program proceeds to block 104 in which it is checked whether $x \geq M_i$. If this is the case, the beginning of track x is situated in portion i. In block 108 one jump the size of the width of u−i portions is made to portion i in which the beginning of the track i is situated, and subsequently the beginning of the track is reached in block 82.

If in program step 104 it is found that $x < M_i$, which means that the beginning of track x is not situated in portion i, the program also returns to block 100 via the branch 106.

If after the fine-search process in block 82 the beginning of track x is found, the search program is terminated in block 83. Subsequently, the apparatus can reproduce the track.

The method as described with reference to FIGS. 3 and 4 may be used in the case that the track numbers of tracks whose beginnings are situated nearest the beginning of the relevant portions P have been stored in the corresponding storage locations. If other track number, for example the numbers of those tracks whose beginnings are situated nearest the ends of the relevant portions P have been stored in the corresponding storage locations, the methods will proceed in a different way and will have a different set-up. It will also be evident that the sequence of some steps in the methods as described with reference to FIGS. 3 and 4 may be changed without the operation being affected.

TABLE 1

Figure 3:
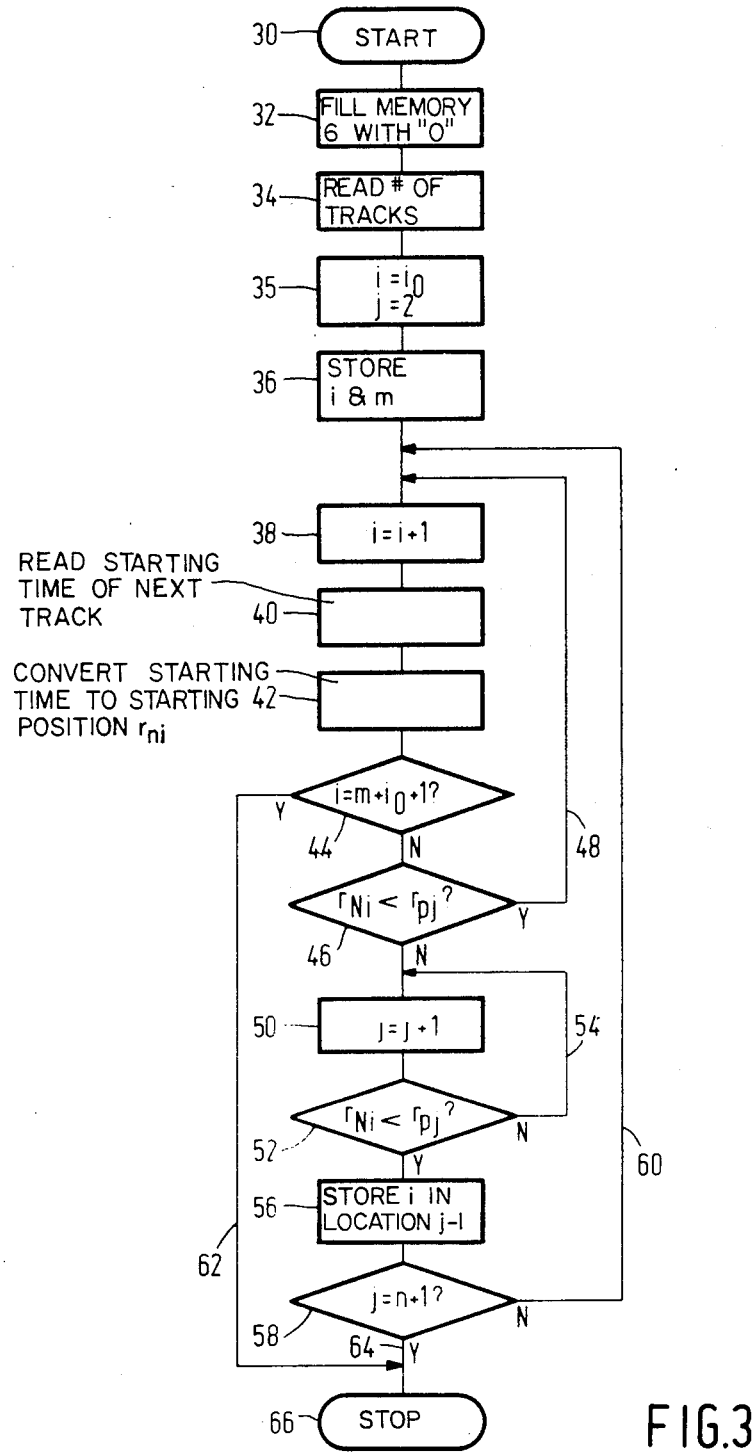
FIG. 3 is a flow chart which represents how the memory is filled.

| Block No. | Legend to FIG. 3. Designation |
|---|---|
| 30 | start |
| 32 | initial filling of memory |
| 34 | read m and $i_o$ (first sequence number |
| 35 | $i = i_o, j = 2$ |
| 36 | store i in 6.1 and m in 6.n + 1 |
| 38 | $i = i + 1$ |
| 40 | read starting time $i^{th}$ track |
| 42 | conversion into position |
| 44 | $i = m + i_o + 1$? |
| 46,52 | $r_{Ni} < r_{pj}$? |
| 50 | $j = j + 1$ |
| 56 | store i in (j-1)th storage location |
| 58 | $j = n + 1$? |
| 66 | stop |

TABLE 2

| | Legend to FIG. 4. |
|---|---|
| 68 | start |
| 70 | reproduce no. x |
| 72 | y > x? |
| 74 | $i = u + 1$ |
| 76,86,94 | read $M_i$ from storage location i |
| 78,88 | $x < M_i$? |
| 82 | fine or binary search of no. x |
| 84 | $i = i + 1$ |
| 90 | coarse jump forward over width of i-u-1 portions |
| 92 | $i = u$? |
| 96,102 | $M_i = O$? |
| 98,104 | $x \geq M_i$? |
| 100 | $i = i - 1$ |
| 108 | coarse jump backward over width of u-i portions |
| 83 | stop. |

What is claimed is:

1. An apparatus for reproducing information stored in the form of at least one information block in a track of a record carrier, said record carrier being divided into a number of portions, the apparatus including:
    first read means for reading said record carrier;
    control means for controlling said read means so that a selected information block from said record carrier can be reproduced;
    wherein the apparatus further comprises:
    a memory having a plurality of storage locations, each location corresponding to one of said portions of said record carrier, each of said storage locations containing a sequence number for identifying, anywhere along a respective portion including but not limited to the beginning of said portion, the location of the beginning of an information block of said portion; and
    first means for storing data relating to sizes and locations of the respective portions on the record carrier or for storing data from which the size and the location of each of the respective portions can be derived.

2. An apparatus as claimed in claim 1, wherein the memory has 10 storage locations at the most.

3. An apparatus as claimed in claim 1, wherein, if the beginning locations of at least two information blocks are situated in one portion of the record carrier, the apparatus further comprises processing means for storing in said memory storage location for said portion containing the beginning locations of said two information blocks the sequence number identifying the location of the information block whose beginning location is situated nearest to the beginning of said portion of the record carrier.

4. An apparatus as claimed in claim 1, further comprising processing means for storing in said memory in the storage location which corresponds to a portion of the record carrier which does not contain the beginning of an information block, a corresponding indication.

5. An apparatus as claimed in claim 1, wherein the memory comprises an additional storage location for storing a number representing the number of information blocks on the record carrier.

6. An apparatus as claimed in claim 1, wherein the apparatus further comprises:
    a second read means for, prior to the reproduction of the record carrier information, reading from the record carrier sequence numbers to be stored in the memory.

7. Apparatus as claimed in claim 6, wherein the record carrier to be read by the apparatus includes a track containing the sequence numbers to be stored in the memory.

8. An apparatus as claimed in claim 1, further comprising:
    second read means for reading, from the record carrier prior to the reproduction of the information, data relating to the location of the beginning of the at least one information block on the record carrier; and
    second means for comparing data relating to the location of the beginning of the information block on the record carrier with data relating to the location of the corresponding portion on the record carrier and for generating, for a portion of the record carrier, a control signal for storing the sequence number identifying the beginning location of the information block in the storage location corresponding to said portion.

9. An apparatus as claimed in claim 1, further comprising:
    third means for comparing the sequence number of a selected information block with sequence numbers stored in the memory and for generating a control signal to be applied to the control means so as to position the first read-means at the beginning of the selected information block, thereby subsequently reproducing said information block.

* * * * *